United States Patent [19]

Damkjaer

[11] Patent Number: 5,307,923
[45] Date of Patent: May 3, 1994

[54] CHAIN-LINK CONVEYOR

[75] Inventor: Poul E. Damkjaer, Vejle, Denmark

[73] Assignee: Maskinfabrikken Baeltix A/S, Vejle, Denmark

[21] Appl. No.: 45,188

[22] Filed: Apr. 13, 1993

[30] Foreign Application Priority Data

Apr. 21, 1992 [DK] Denmark ............... 523/92

[51] Int. Cl.5 ............................................. B65G 17/06
[52] U.S. Cl. ................................. 198/852; 198/853
[58] Field of Search ............... 198/851, 852, 853, 831

[56] References Cited

U.S. PATENT DOCUMENTS

| | | | |
|---|---|---|---|
| 4,153,152 | 5/1979 | Lapeyre | 198/852 X |
| 4,597,492 | 7/1986 | Lachonius et al. | 198/852 |
| 4,645,070 | 2/1987 | Homeier | 198/852 X |
| 4,754,872 | 7/1988 | Damkjaer | 198/852 |
| 4,893,709 | 1/1990 | Schroeder et al. | 198/852 |
| 4,961,492 | 10/1990 | Wiseman et al. | 198/852 X |

Primary Examiner—Cheryl L. Gastineau
Attorney, Agent, or Firm—Antonelli, Terry, Stout & Kraus

[57] ABSTRACT

A chain-link conveyor comprising a plurality of chain links hinged together by transversely extending hinge pins disposed in traction eyes. A top plate of each chain link is provided with fingers and recesses disposed between the respective fingers at both a front edge and a rear edge, as viewed in a direction of movement of the conveyor. The fingers are staggered with respect to each other so that the fingers and recesses on adjacent links are adapted to engage with each other. An additional finger is disposed substantially centrally of the chain link in the front edge, as viewed in the direction of movement of the conveyor and the corresponding central recess is provided in the rear edge of an adjacent link. The chain links may be injected moulded plastic links or links blanked from sheet metal.

11 Claims, 5 Drawing Sheets

CHAIN-LINK CONVEYOR

BACKGROUND OF THE INVENTION

The present invention relates to a chain link conveyor comprising a plurality of identical chain links hinged by transversely extending hinge pins insertable through eye part at front and rear edges of adjacent links so as to enable the hinged links to be pivotable about both a normally horizontally disposed hinge pin and, to a limited extent, about a normally vertical axis through a mid point of the hinge assembly, wherein an edge of each chain link includes two eye parts and the other edge includes one eye part for receiving the hinge pin of an adjacent link, with the opening of the one eye part making it possible by the hinge pin to be moved only during running of the conveyor. Each chain link includes a top plate arranged to support articles to be transported with the conveyor, with the top plate including a plurality of fingers separated by recesses and extending out from the front edge and rear edge of the respective links, and with at least one recess and at least one finger being disposed at a center line of the link.

Chain link conveyors of the aforementioned type include a large number of identical hinged chain links so as to form an endless conveyor. The individual chain links are configured so that the chain can be fed around drive sprockets and carrier wheels, and so that the chain can run through normally horizontally-disposed curves or bends. Chains for such conveyors are commonly known as flex-chains which are, unlike the types of chains which can run only in a straight line, and which are therefore known as straight-running chains. The invention thus relates to a flex-chain for a chain-link conveyor, wherein the chain links can be made of plastic or metal and, preferably, stainless steel.

It is a common problem when flex-chains are run in curves that the chain opens at the outer edge of the curve, which limits the size of the articles which may be placed on the conveyor. If only small openings are desired in the use of commonly-known chains for running around curves, this normally necessitates the use of curves with a large radius, which has many disadvantages.

In, for example, U.S. Pat. No. 4,676,368, a metal flex-chain for chain-link conveyors is proposed which is adapted to run in curves having radii of 20-25 cm. With such a construction relatively large openings may arise in the support surface of the conveyor.

In U.S. Pat. No. 4,754,872, a plastic flex-chain for a conveyor is proposed, wherein the top of each chain link is provided with ribs of a special configuration, so that running in curves results in a number of smaller openings in the support surface of the conveyor. However, chain-link conveyors of this type have limited application, in that such chain-link conveyors can naturally only be used for the transport of items which can be supported by the upper surface of the ribs.

In U.S. Pat. No. 4,893,709, a so-called flex-chain of the type described above is proposed; however, the coupling between the chain links is effected with a cardan link which, among other things, comprises a substantially spherical coupling part insertable in each chain link and through which the hinge pin in each link is inserted. The construction achieved hereby is complicated and has several disadvantages; namely, it is difficult to clean the chain links sufficiently, and the construction automatically results in a relatively high construction height, that is, a relatively thick conveyor which requires high side rails, etc. Furthermore, the central projection is positioned so that it extends out over the cardan link, which further increase the height of the construction and results in a relatively large opening between the projection on a link and the recess of the adjacent link.

Additionally, U.S. Pat. No. 4,893,709 proposes a configuration which is in the form of plastic chain links.

SUMMARY OF THE INVENTION

According to the invention, a chain link conveyor of the aforementioned type has the advantage that the flex-chain has a support surface generally without large openings, but where the unavoidable openings occur when running the conveyor in curves, the openings are divided into a number of smaller openings. The actual top or top plate of the individual chain links is configured in one piece with fingers separated by recesses, with the result being that the conveyor surface is planar, and thus the resulting conveyor has many different possibilities of application. Due to the configuration of the chain links of the present invention, the conveyor is very easy to clean and can be cleaned completely.

In order for the chain links to be able to be turned in relation to each other around the hinge pin, the opening is configured in a known manner with increasing clearance from the middle and out towards the side, which provides great advantages from the point of view of cleaning. Moreover, the configuration makes it possible to achieve a very low construction height.

An advantage of the present invention resides in the fact that the discontinuities in the surface of the chain, which the known chains have in the area where the links are hinged together, are avoided, and the resulting surface is totally more planar and with less non-supporting surface area than is the case with the known chains, and hereby without any restrictions arising in the characteristics of the chain and area of application, including characteristics in connection with the running in curves, not even sharp curves.

In accordance with additional features of the present invention, the fingers extending from the front edges, with the exception of the centrally disposed finger, are staggered with respect to the rear edge fingers, moreover, the front and rear edges of the chain link include soft transitions and roundings such that the fingers on one link are disposed opposite recesses in an adjacent chain link and are formed in such a manner that they fit into each other when the chain links are turned to a maximum degree around the horizontal axis through a center point of the hinge assembly. Moreover, at least one finger on each chain link is of such a length that it extends forward over a center line of the hinge pin.

By virtue of the last noted features of the present invention, the resulting chain link conveyor can be used for innumerable purposes without the advantages achieved being reduced, and where the conveyor has a relatively large supporting surface.

The broader the track of the individual chain links is required to be, the more fingers and associated recesses are provided in the front and rear edges of the links, and the smaller required in the curve, the longer fingers and deeper recesses can be used.

The chain-link conveyor according to the invention is thus based on a new configuration of the individual chain links so that the supporting surface and/or plate together with the upper side of the fingers constitute a planar, or a substantially planar supporting surface. With a conveyor of this kind, even relatively small articles can be transported without the articles toppling over, or without the articles getting jammed in the chains. Also, with straight running conveyors, the chain has the unavoidable openings divided into a number of smaller openings, so that even with straight running conveyors no undesirable openings arise. The result is that the chain, according to the invention, has a very wide area of application.

In accordance with further features of the present invention, each chain link is provided as one unit by plastic injection molding, with a thickness of the central finger being reduced at the top of the finger, whereby all of the known advantages of plastic chain links are transferred to the chain according to the invention. The resulting flex-chain of plastic thus offers a combination of all of the known characteristics of plastic chains with the advantages of the chain according to the invention.

The recess provided at the center line of the chain link may include a groove from the upper side of the top of the plate whereby the possibility is provided, by virtue of the present invention, of configuring the individual links with a longer central finger than would otherwise be the case, and the tip of the finger, which is reduced in thickness, can be placed in such a manner that the chain can be bent backwards without giving rise to any problems, and without the finger extending up over the support surface when the chain is fed over a drive sprocket or a carrier wheel.

According to the present invention, each chain link is produced by blanking from a sheet metal and by subsequent deforming of the blanked out item, where one edge of the chain link comprises two rolled eye parts for the securing of the hinge pin, while the opposite edge comprises at least one rolled eye part with an opening for the hinge pin. The at least one eye part includes a central portion of a reduced thickness produced, for example, by coining of the surface or by blanking of a hole. Advantageously, the thickness of the central finger is reduced at the top of the finger.

By virtue of the last-mentioned features of the present invention, the chain link according to the invention can be combined with all of the known characteristics of chain links of metal and without any new disadvantages arising in this connection.

On the contrary, the chain link according to the invention can be configured and produced from sheet metal, without hereby giving rise to an increase in the consumption of raw materials. The individual chain links are blanked out in the same manner as the known chain links, that is, from a metal strip with a breadth corresponding to a breadth of the finished chain link.

With the chain link according to the invention, the extra material for the fingers is simply taken from the intermediate part which, with normal blanking, is discarded as scrap. The amount of scrap is thus reduced, but just as many chain links according to the invention can be produced per unit or length of raw material as known chain links, so that the improvements are achieved without any increase in the consumption of raw materials. Moreover, with the metal chain link according the invention, it is possible to achieve a particularly small constructional height, which makes the conveyor economically advantageous.

The centrally produced thickness of material provides room for the central finger of the adjacent link. The reduction in the amount of material or material thickness is achieved either by coining, for example, on the order of one-third to one-half of the material thickness, or by the blanking of a hole. If the blanking of a hole is used, this must naturally be effected with a smaller diameter than by a depth coining of the material.

It can also be advantageous with metal chain links for the thickness of the central figure to be reduced at the tip of the finger, but here this could be effected by a rounding off or an edge-stamping of the material depending on how great a reduction of thickness is necessary.

BRIEF DESCRIPTION OF THE DRAWINGS

The invention will now be described in more detail with reference to the accompanying drawings, which show, for the purpose of illustration only, a number of embodiments of the invention, wherein.

DETAILED DESCRIPTION

Figure 5:
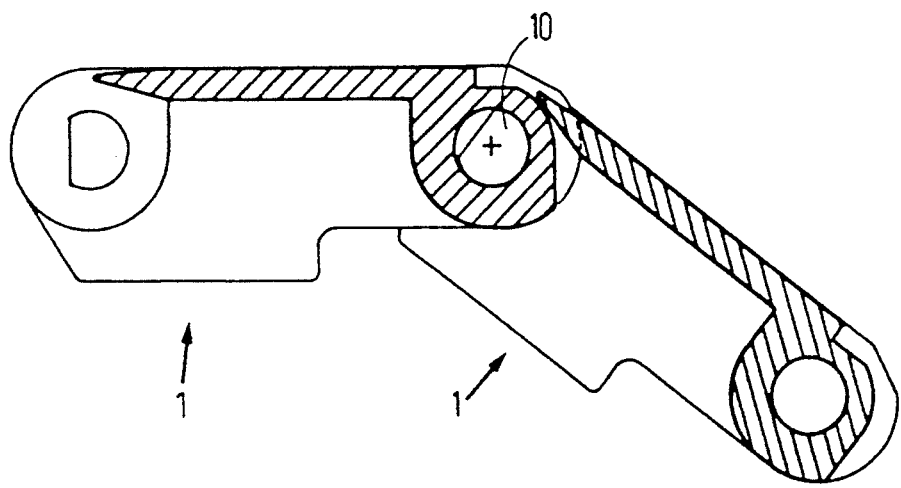
FIG. 5 is a cross-sectional view of a central section of two chain links, when the chain is fed around a drive sprocket or carrier wheel.
Figure 6:
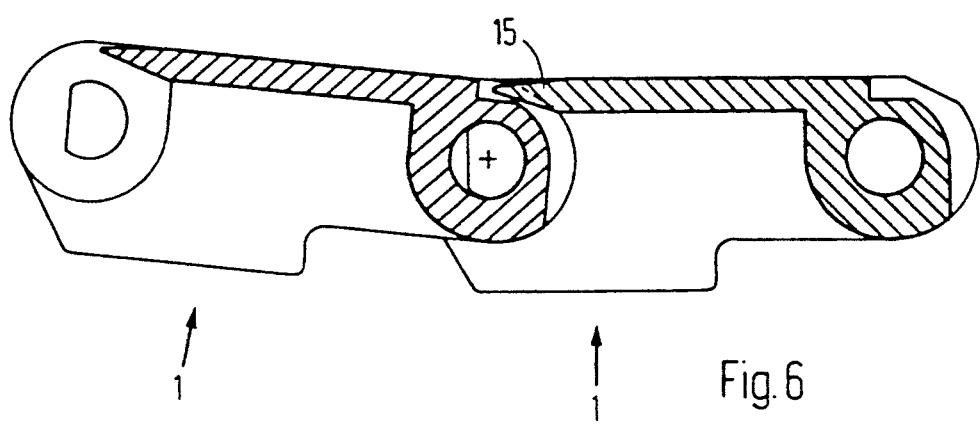
FIG. 6 is a cross-sectional view of a central section of FIG. 5, but where the chain is bent backwards.
Figure 7:
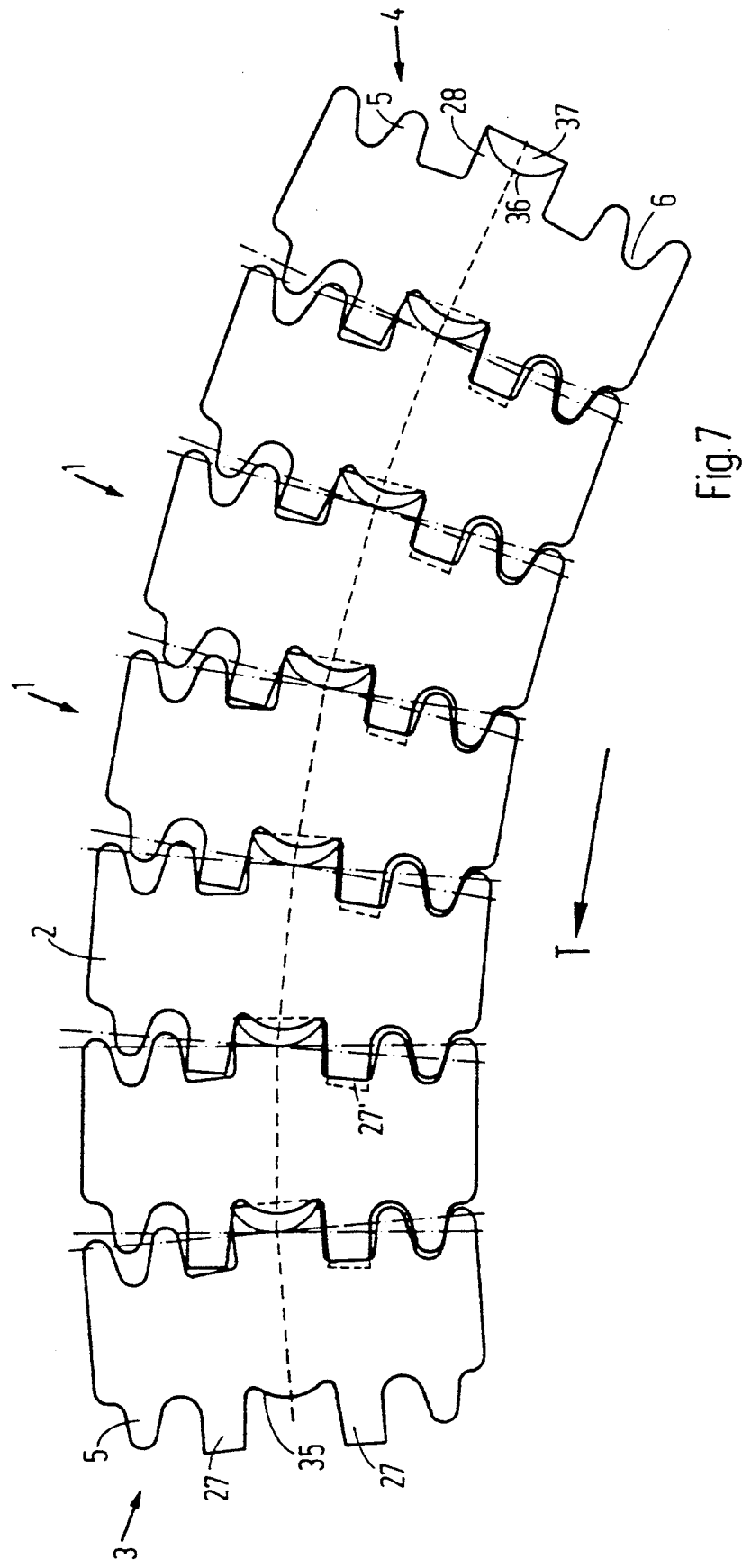
FIG. 7 is a planar view of a length of a conveyor chain according to the invention built up of metal chain links for relatively large curve radii.
Figure 8:
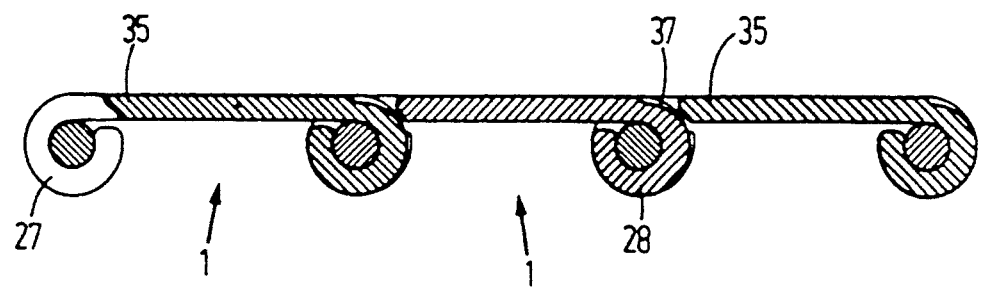
FIG. 8 is a cross-sectional view taken along the line VIII—VIII in FIG. 9.
Figure 9:
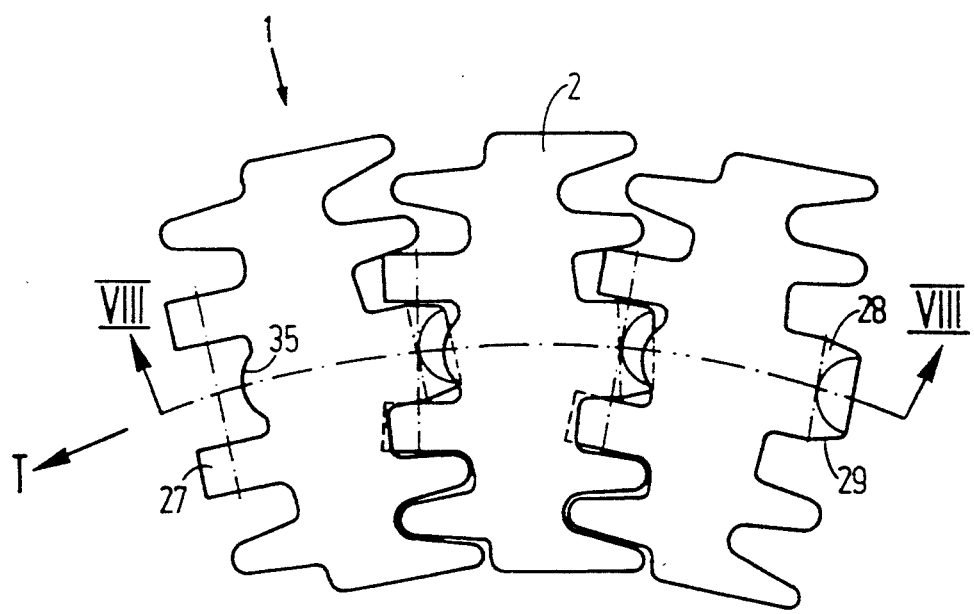
FIG. 9 is a plan view of a length of chain-link conveyor according to the invention with metal chain links for smaller curve radii.

FIGS. 1-6 of the drawing show conveyor chain links of plastic with FIGS. 7-9 showing conveyor chain links of sheet metal, both configured according to the invention, which can thus be exercised on both type of chain link.

In the drawings only the actual conveyor chain is shown, in that all things in connection with a conveyor constructed with the chain links according to the invention, for example, guides, and slide rails, driving sprockets and carrier wheels, structures for the building of conveyor plants and so on are not illustrated in that these parts can be configured in a commonly-known manner, which also means the chain links according to the invention can be used in connection with already existing conveyors, for example, in connection with the improvement, reconstruction or renovation of such conveyors.

An underside of the chain link is included in the drawing only for the sake of completeness, in that the underside can be configured in many other ways than that shown, the reason being that the invention, in principle, concerns a top plate of the chain link, regardless of whether this is an integral part of the chain link or configured as an independent top plate which is fastened to the underpart of the chain link. The examples in the drawings show only the chain link where the top plate is an integral part of the chain link, because this has many advantages from the point of view of production economy, but it does not exclude other configurations.

Moreover, the chain links are shown with a preferred running direction designated by an arrow T, and the expressions front edge 3 and rear edge 4 are used in the explanation. This is solely to simplify the explanation, in that it will be readily apparent to those familiar with the art that there are no technical reasons why the conveyor cannot run in the opposite direction, that is, a direction opposite to the direction indicated by the arrow T.

The chain links in the drawing are shown in one embodiment for plastic chains and one embodiment for metal chains. As readily apparent to those familiar in the art, the chain links can be configured in breadths other than those shown without any fundamental changes, and also with another number of fingers and with narrower or broader fingers, all depending on the use of the conveyor. The detail configuration of the chain links also depends on the sharpness of the horizontal curve for which the chain is to be used.

Figure 1:
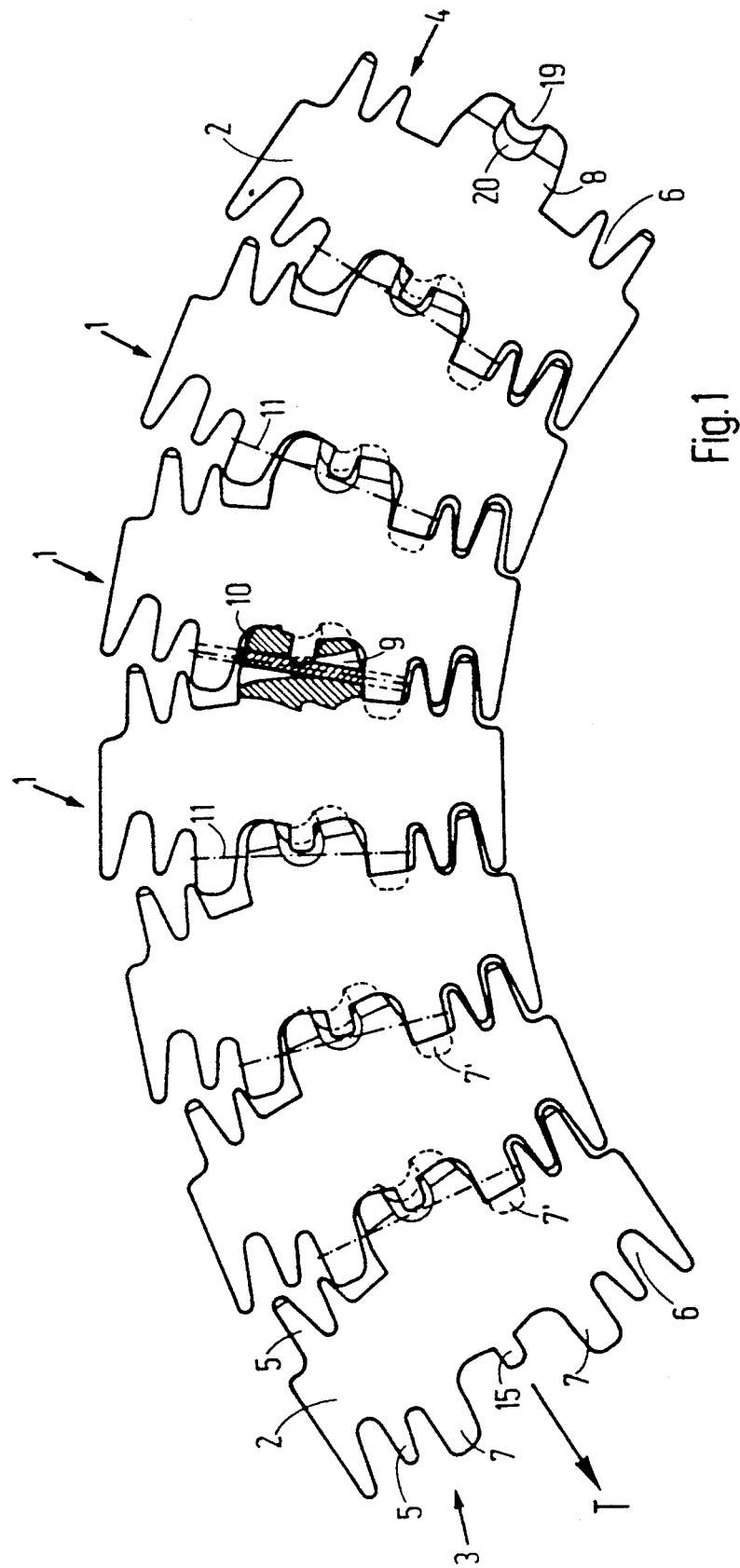
FIG. 1 is a plan view partially cut-away of a length of conveyor chain according to the invention composed of plastic chain links.
Figure 2:
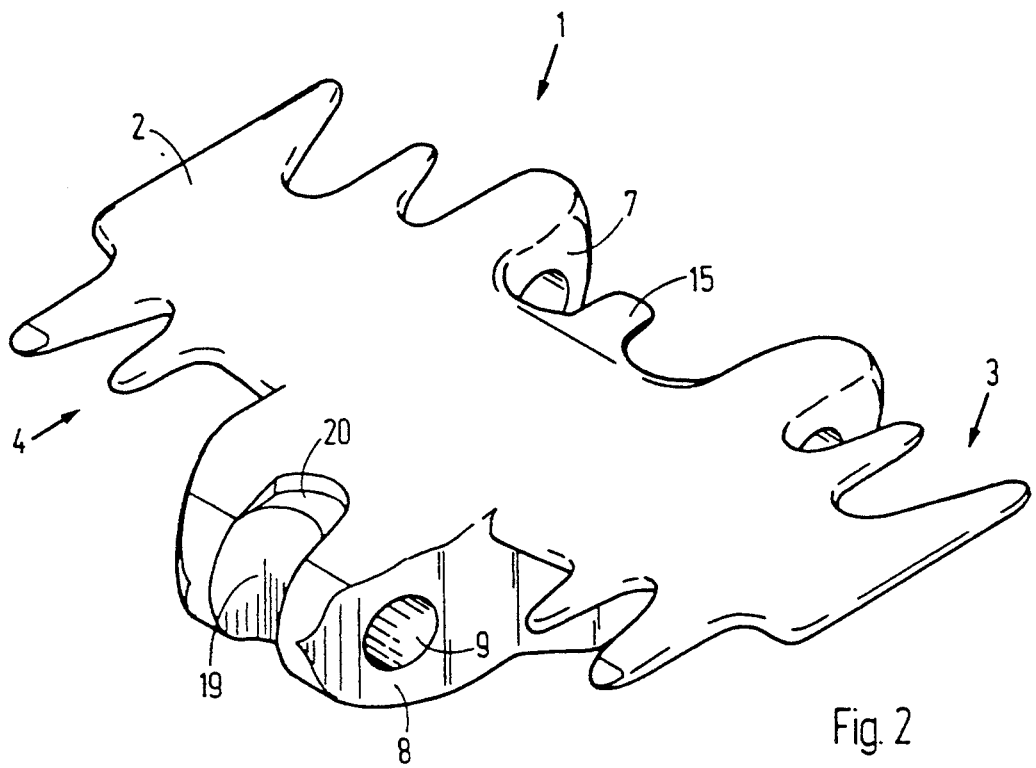
FIG. 2 is a perspective view of a chain link of the conveyor chain of FIG. 1.

As shown in FIG. 1, a plurality of identical plastic chain links generally designated by the reference numeral 1 each include an integrated or integral top plate 2, with the top plate 2 including a front edge generally designated by the reference numeral 3 and a rear edge generally designated by the reference numeral 4, and with the front edge 3 and the rear edge 4 each having fingers 5 and recesses 6 between the respective fingers 5, all with round-off edges and, preferably with soft curves to which it is necessary. In FIG. 1 is shown how the fingers 5 and the recess 6 of the chain links 1 engage with one another, so that the track is almost unbroken in the inner half when running in curves, and how the unavoidable openings in the outer half of the chain are divided into a number of smaller openings.

The chain links 1 have hinge eyes or traction eyes 7 in the normal manner for a hinge pin 10 in the front edge 3 of the chain link 1, in that the hinge pin 10 passes through an opening 9 in a hinge eye 8 in the rear edge 4 of the adjacent chain link 1. The opening 9 is configured in a known manner with increasing clearance out from the center line, so that the chain links 1 can be turned relative to each other, and as shown in the cut away section in the center of FIG. 1. The line 11 depicts the center axis of the hinge pin 10.

Figure 3:
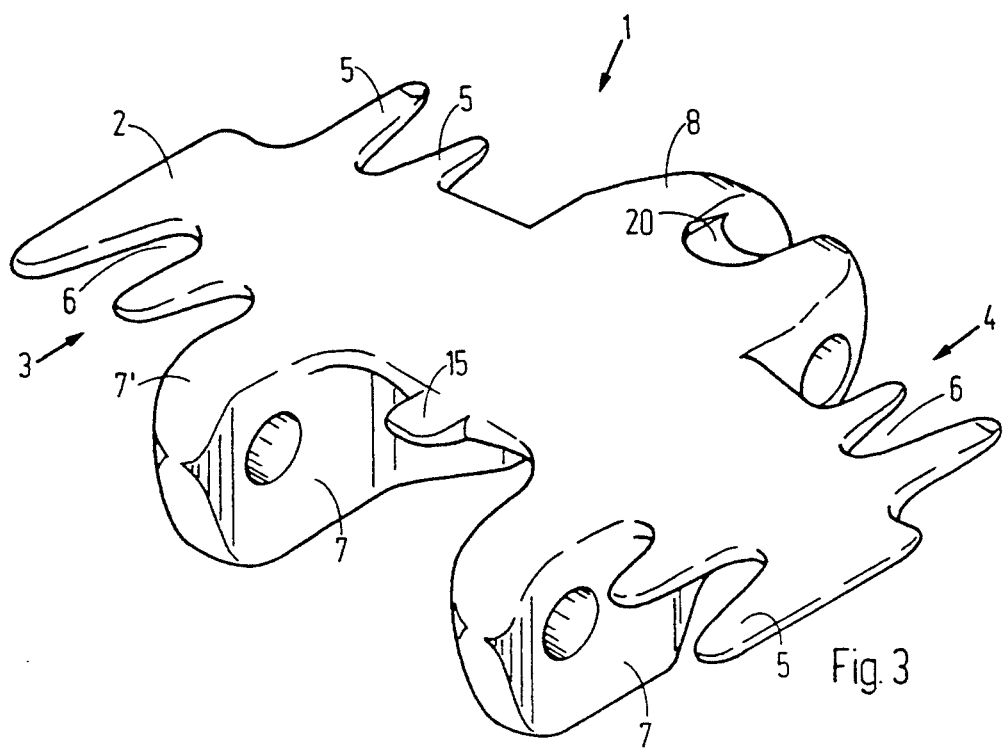
FIG. 3 is a perspective view of the chain link of FIG. 2, but viewed from the opposite side.

The traction eyes 7 are, as shown most clearly in FIG. 3, configured with cambers on the upper side, so that the foremost part 7' can slide slightly in under the top plate of an adjacent chain link 1 when running in curves. In order for the top plate of the conveyor to be made as even and unbroken as possible, an additional finger (FIGS. 1-3 and 6) is placed centrally in the front edge 3 of the chain link 1, and the rear edge 4 of the chain link 1 is provided with a central recess 19 (FIGS. 1, 2 and 4), so that the central finger 15 in a chain link 1 fits into the central recess 19 in the adjacent chain link 1.

Figure 4:
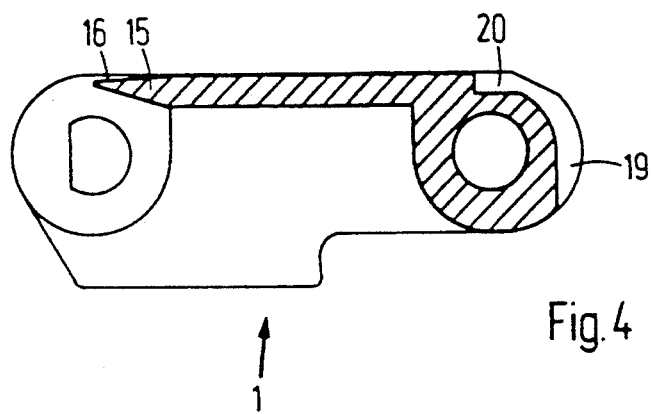
FIG. 4 is a cross-sectional view of a central section of the chain link of FIGS. 2 and 3.

FIGS. 4-6 show, in more detail, the manner in which the central finger 15 can have a reduced thickness towards the tip, so that the central finger 15 fits better into a notch 20 in the top plate of the adjacent chain link 1, with the notch 20 being configured as an integral part of the recess 19, as shown most clearly in FIG. 4. FIG. 5 shows the manner in which adjacent chain links 1 interact when the conveyor chain is fed over a drive sprocket or a carrier wheel (not shown), and FIG. 6 shows the manner in which the chain links 1, and especially the central finger 15 and the notch 20, interact when the conveyor chain is bent slightly backwards. The metal chain links in FIGS. 7-9 represent two embodiments, with FIG. 7 depicting chain links for horizontal curves with radii of a maximum of 500 mm, and FIG. 9 depicting chain links for horizontal curves with radii of a maximum of 200 mm. As apparent from FIGS. 7-9, there is a difference in the breadth of the fingers 5 and a corresponding difference in the breadth of the recesses 6. The metal chain links 1 are produced in a commonly-known manner by blanking from metal strip, for example, stainless steel of suitable width, and the blanked-out items are subsequently processed by stamping and rolling for the formation of the traction eyes 27 and 28. The traction eyes 27 are configured in such a way that the foremost part 27'(FIG. 7), when running in curves, can slide freely under the top plate 2 of the preceding chain link 1.

The metal chain links 1 have a central finger 35 in the front edge 33 and a coining 37 corresponding hereto in the traction eye 28 in the rear edge 4. With metal links, it is thus possible to avoid having a central recess in the traction eye 28 in the rear edge 4, in that it is sufficient to have a coining 37, see especially FIG. 8, with the coining 37 providing room for the central finger 35. The coining 37 is carried out, for example, so that $\frac{1}{3}$-$\frac{1}{2}$ of the material thickness in the traction eye 28 is deformed away in the area where the central finger 35 from the adjacent chain link extends in over the traction eye, or it is possible simply to carry out the blanking of a hole which merely needs to have a diameter in the order a half part of the coining 37. The coining or blanked hole will not result in any significant reduction in the tensile strength of the chain, and since material is not removed directly from the places in the hinge part where the tractional forces are transferred from link to link, there is no reduction in the wearing qualities or lifetime of the chain links.

Finally, if the steel chains are to be used in curves with small radii, the traction eye 28 in the rear edge 4 of the chain link can be configured with angled sides 29 as shown in FIG. 9.

I claim:

1. A chain link conveyor comprising a plurality of identical chain links each including eye parts at front and rear edges of adjacent links, as viewed in a direction of travel of the conveyor, transversely extending hinge pins inserted through the eye parts of adjacent links for enabling each pair of hinged links to be mutually swingable about both a normally horizontally-disposed axis of the respective hinge pins and, to a limited extent, about a normally vertical axis through a mid-point of a hinge assembly formed by the respective hinge pins and eye parts, wherein one of the front or rear edges of each chain link includes two eye parts for receiving one of the hinge pins and the other of the front or rear edges includes a single eye part with an opening for receiving the hinge pin of the adjacent link, said opening enabling the hinge pin to be moved only during the running of the conveyor, each chain link comprises a top plate arranged to support items to be transported by the conveyor, said top plate including a plurality of fingers separated by recesses, said fingers extending from both the front edge and rear edge of the respective chain links, as viewed in the direction of travel of the conveyor, and wherein said at least one finger positioned at the center line is placed between the two eye parts provided on said one edge of each chain link.

2. A chain-link conveyor according to claim 1, wherein the fingers extending from one of the front or rear edges, except for the finger at the center line, are staggered with respect to the fingers at the other of the front of rear edges.

3. A chain-link conveyor according to claim 2, wherein the front and rear edges of the respective chain links are configured with transitions and roundings, and wherein the fingers on one chain link are disposed opposite recesses in an adjacent chain link and are formed in such a manner that the fingers and associated recesses fit into each other when the chain links are turned to a maximum degree about the horizontal axis through the mid-point of the hinge assembly.

4. A chain-link conveyor according to claim 3, wherein at least one finger on each chain link is of a length such that the finger extends forward over a center line of the hinge pin.

5. A chain-link conveyor according to claim 1, wherein each chain link is produced as a unit by plastic injection moulding, and wherein a thickness of the finger positioned at the center line is reduced at a tip of the finger.

6. A chain-link conveyor according to claim 5, wherein the recess provided at the center line of the chain link includes a groove extending from the upper side of the top plate.

7. A chain-link conveyor according to claim 5, wherein an upper side of the top plate including an upper side of the fingers forms a substantially common plane.

8. A chain link conveyor according to claim 1, wherein each of the chain links are formed from blanked sheet metal, with each of the eye parts being fashioned by deforming the blanked sheet metal, and wherein said single eye part has a reduced thickness at a central part thereof produced by one of coining or blanking a surface of said single eye part.

9. A chain link conveyor according to claim 1, wherein each chain link is produced from blanked sheet metal, and wherein a thickness of the finger positioned at the center line is reduced at a tip of the finger.

10. A chain link conveyor according to claim 9, wherein the recess provided at the center line of the chain link includes a groove extending from an upper side of the top plate.

11. A chain link according to claim 8, wherein an upper side of the top plate including an upper side of the fingers form a substantially common plane.

* * * * *